US012589503B2

(12) United States Patent
Ono et al.

(10) Patent No.: US 12,589,503 B2
(45) Date of Patent: Mar. 31, 2026

(54) ROBOT CONTROL APPARATUS, ROBOT CONTROL SYSTEM, AND METHOD FOR CONTROLLING ROBOT

(71) Applicant: KYOCERA Corporation, Kyoto (JP)

(72) Inventors: Kazuki Ono, Osaka (JP); Masato Mori, Osaka (JP); Takayuki Ishida, Hirakata (JP); Hiroaki Miyamura, Osaka (JP)

(73) Assignee: Kyocera Corporation, Kyoto (JP)

( * ) Notice: Subject to any disclaimer, the term of this patent is extended or adjusted under 35 U.S.C. 154(b) by 356 days.

(21) Appl. No.: 18/023,222

(22) PCT Filed: Aug. 4, 2021

(86) PCT No.: PCT/JP2021/028972
§ 371 (c)(1),
(2) Date: Feb. 24, 2023

(87) PCT Pub. No.: WO2022/044742
PCT Pub. Date: Mar. 3, 2022

(65) Prior Publication Data
US 2023/0294292 A1 Sep. 21, 2023

(30) Foreign Application Priority Data

Aug. 27, 2020 (JP) ................................. 2020-143909

(51) Int. Cl.
B25J 9/16 (2006.01)
(52) U.S. Cl.
CPC ........... B25J 9/1697 (2013.01); B25J 9/1664 (2013.01)

(58) Field of Classification Search
CPC ... A61B 34/35; A61B 34/30; A61B 2034/301; A61B 2034/302; A61B 2034/2059;
(Continued)

(56) References Cited

U.S. PATENT DOCUMENTS

| 8,812,159 B2 | 8/2014 | Maehara et al. |
| 11,402,824 B2 | 8/2022 | Tango et al. |
(Continued)

FOREIGN PATENT DOCUMENTS

| CN | 102189552 A | 9/2011 |
| JP | 2003-165079 A | 6/2003 |
(Continued)

*Primary Examiner* — Harry Y Oh
(74) *Attorney, Agent, or Firm* — Procopio, Cory, Hargreaves & Savitch LLP

(57) ABSTRACT

A robot control apparatus includes a control unit that generates, as control information, information regarding an amount of movement for controlling a motion of a robot and that outputs the control information, an information obtaining unit that obtains, as actual physical information, physical information indicating a result of an actual motion of the robot based on the control information, a motion estimation unit that outputs information output from a model plant, which is obtained by modeling an ideal state of the robot, by inputting the control information to the model plant as estimated physical information, which is obtained when the robot is assumed to move ideally on a basis of the control information, and a state estimation unit that estimates a state of the robot on a basis of the actual physical information and the estimated physical information. The control unit generates the control information further on a basis of a result of the estimation of the state of the robot.

16 Claims, 3 Drawing Sheets

(58) Field of Classification Search
CPC ........ A61B 2034/303; A61B 2090/066; A61B
34/37; A61B 34/74; B25J 9/06; B25J
9/1643; B25J 9/1666; B25J 9/1689; B25J
15/0019; B25J 15/0052; B25J 5/007;
B25J 9/16; B25J 9/0087; G05B
2219/40201; G05B 2219/40202
See application file for complete search history.

(56) References Cited

U.S. PATENT DOCUMENTS

| | | | | |
|---|---|---|---|---|
| 2007/0075055 | A1* | 4/2007 | Komatsu | B23K 26/0884 |
| | | | | 219/121.81 |
| 2007/0282485 | A1* | 12/2007 | Nagatsuka | G05B 19/4069 |
| | | | | 700/245 |

| | | | | |
|---|---|---|---|---|
| 2011/0224826 | A1* | 9/2011 | Maehara | B25J 9/1676 |
| | | | | 700/255 |
| 2013/0338827 | A1* | 12/2013 | One | G05B 19/423 |
| | | | | 901/41 |
| 2015/0100194 | A1* | 4/2015 | Terada | G05D 1/0214 |
| | | | | 701/25 |
| 2019/0061155 | A1* | 2/2019 | Hashimoto | B25J 9/1666 |
| 2020/0009730 | A1* | 1/2020 | Henriksson | G05B 19/423 |
| 2020/0070346 | A1 | 3/2020 | Oaki | |
| 2021/0178578 | A1* | 6/2021 | Nakai | B25J 9/1671 |

FOREIGN PATENT DOCUMENTS

| | | | |
|---|---|---|---|
| JP | 2006-043792 | A | 2/2006 |
| JP | 2011-212831 | A | 10/2011 |
| JP | 2020-71727 | A | 5/2020 |
| WO | WO-2017198299 | A1 * | 11/2017 |

* cited by examiner

ROBOT CONTROL APPARATUS, ROBOT CONTROL SYSTEM, AND METHOD FOR CONTROLLING ROBOT

CROSS-REFERENCE TO RELATED APPLICATIONS

The present application claims priority to Japanese Patent Application No. 2020-143909 (filed Aug. 27, 2020), and the contents of this application is incorporated herein by reference in their entirety.

TECHNICAL FIELD

The present disclosure relates to a robot control apparatus, a robot control system, and a method for controlling a robot.

BACKGROUND OF INVENTION

Control apparatuses having a teaching and playback function for causing a robot to perform a certain operation are known (e.g., refer to Patent Literature 1).

CITATION LIST

Patent Literature

Patent Literature 1: Japanese Unexamined Patent Application Publication No. 2003-165079

SUMMARY

In an embodiment of the present disclosure, a robot control apparatus includes a control unit, an information obtaining unit, a motion estimation unit, and a state estimation unit. The control unit generates, as control information, information regarding an amount of movement for controlling a motion of a robot on a basis of information regarding an operation target of the robot included in information regarding a space where the motion of the robot is affected and outputs the control information to the robot. The information obtaining unit obtains, as actual physical information, physical information indicating a result of an actual motion of the robot based on the control information. The motion estimation unit outputs information output from a model plant, which is obtained by modeling an ideal state of the robot, by inputting the control information to the model plant as estimated physical information, which is physical information obtained when the robot is assumed to move ideally on a basis of the control information. The state estimation unit estimates a state of the robot on a basis of the actual physical information and the estimated physical information. The control unit generates the control information further on a basis of a result of the estimation of the state of the robot.

In another embodiment of the present disclosure, a robot control apparatus includes a planning unit, an information obtaining unit, a motion estimation unit, and a state estimation unit. The planning unit plans a route and a motion of a robot on a basis of information regarding an operation target of the robot included in information regarding a space where the motion of the robot is affected. The information obtaining unit obtains, as actual physical information, physical information indicating a result of an actual motion of the robot based on the planned route and motion of the robot. The motion estimation unit outputs information output from a model plant by inputting control information to the model plant as estimated physical information, which is obtained when the robot is assumed to move ideally on a basis of the control information. The model plant is obtained by modeling an ideal state of the robot. The control information is information regarding an amount of movement for the controlling the motion of the robot and determined in accordance with the planned route and motion of the robot. The state estimation unit estimates a state of the robot on a basis of the actual physical information and the estimated physical information. The planning unit plans the route and the motion of the robot further on a basis of a result of the estimation of the state of the robot.

In another embodiment of the present disclosure, a robot control apparatus includes a planning unit, a control unit, an information obtaining unit, a motion estimation unit, and a state estimation unit. The planning unit plans a route and a motion of a robot on a basis of information regarding an operation target of the robot included in information regarding a space where the motion of the robot is affected. The control unit generates control information regarding an amount of movement for controlling the motion of the robot on a basis of the planned route and motion of the robot obtained from the planning unit and outputs the control information to the robot. The information obtaining unit obtains, as actual physical information, physical information indicating a result of an actual motion of the robot based on the control information. The motion estimation unit outputs information output from a model plant, which is obtained by modeling an ideal state of the robot, by inputting the control information to the model plant as estimated physical information, which is obtained when the robot is assumed to move ideally on a basis of the control information. The state estimation unit estimates a state of the robot on a basis of the actual physical information and the estimated physical information. The planning unit plans the route and the motion of the robot further on a basis of a result of the estimation of the state of the robot. The control unit generates the control information further on a basis of the result of the estimation of the state of the robot.

In another embodiment of the present disclosure, a robot control system includes the robot control apparatus, the robot, a spatial information obtaining unit that obtains information regarding a space where a motion of the robot is affected, and a sensor that detects physical information regarding the robot.

In another embodiment of the present disclosure, a method for controlling a robot includes generating, as control information, information regarding an amount of movement for controlling a motion of a robot on a basis of information regarding an operation target of the robot included in information regarding a space where the motion of the robot is affected and outputting the control information to the robot. The method for controlling a robot includes obtaining, as actual physical information, physical information indicating a result of an actual motion of the robot based on the control information. The method for controlling a robot includes outputting information output from a model plant, which is obtained by modeling an ideal state of the robot, by inputting the control information to the model plant as estimated physical information, which is obtained when the robot is assumed to move ideally on a basis of the control information. The method for controlling a robot includes estimating a state of the robot on a basis of the actual physical information and the estimated physical information. The method for controlling a robot includes generating the control information further on a basis of a result of the estimation of the state of the robot.

In another embodiment of the present disclosure, a method for controlling a robot includes planning a route and a motion of a robot on a basis of information regarding an operation target of the robot included in information regarding a space where the motion of the robot is affected. The method for controlling a robot includes obtaining, as actual physical information, physical information indicating a result of an actual motion of the robot based on the planned route and motion of the robot. The method for controlling a robot includes outputting information output from a model plant by inputting control information to the model plant as estimated physical information, which is obtained when the robot is assumed to move ideally on a basis of the control information. The model plant is obtained by modeling an ideal state of the robot. The control information is information regarding an amount of movement for controlling the motion of the robot and determined in accordance with the planned route and motion of the robot. The method for controlling a robot includes estimating a state of the robot on a basis of the actual physical information and the estimated physical information. The method for controlling a robot includes planning the route and the motion of the robot further on a basis of a result of the estimation of the state of the robot.

In another embodiment of the present disclosure, a method for controlling a robot includes planning a route and a motion of a robot on a basis of information regarding an operation target of the robot included in information regarding a space where the motion of the robot is affected. The method for controlling a robot includes generating control information regarding an amount of movement for controlling the motion of the robot on a basis of the planned route and motion of the robot and outputting the control information to the robot. The method for controlling a robot includes obtaining, as actual physical information, physical information indicating a result of an actual motion of the robot based on the control information. The method for controlling a robot includes outputting information output from a model plant, which is obtained by modeling an ideal state of the robot, by inputting the control information to the model plant as estimated physical information, which is obtained when the robot is assumed to move ideally on a basis of the control information. The method for controlling a robot includes estimating a state of the robot on a basis of the actual physical information and the estimated physical information. The method for controlling a robot includes planning the route and the motion of the robot further on a basis of a result of the estimation of the state of the robot. The method for controlling a robot includes generating the control information further on a basis of the result of the estimation of the state of the robot.

DESCRIPTION OF EMBODIMENTS

When a robot is taught an appropriate motion in accordance with a state thereof, the motion might become inappropriate depending on a change in the state of the robot. It is required that a robot operate appropriately in accordance with a state thereof. An embodiment of a robot control apparatus, a robot control system, and a method for controlling a robot capable of appropriately moving a robot in accordance with a state of the robot will be described hereinafter.

(Example of Configuration of Robot Control System 1)

Figure 1:
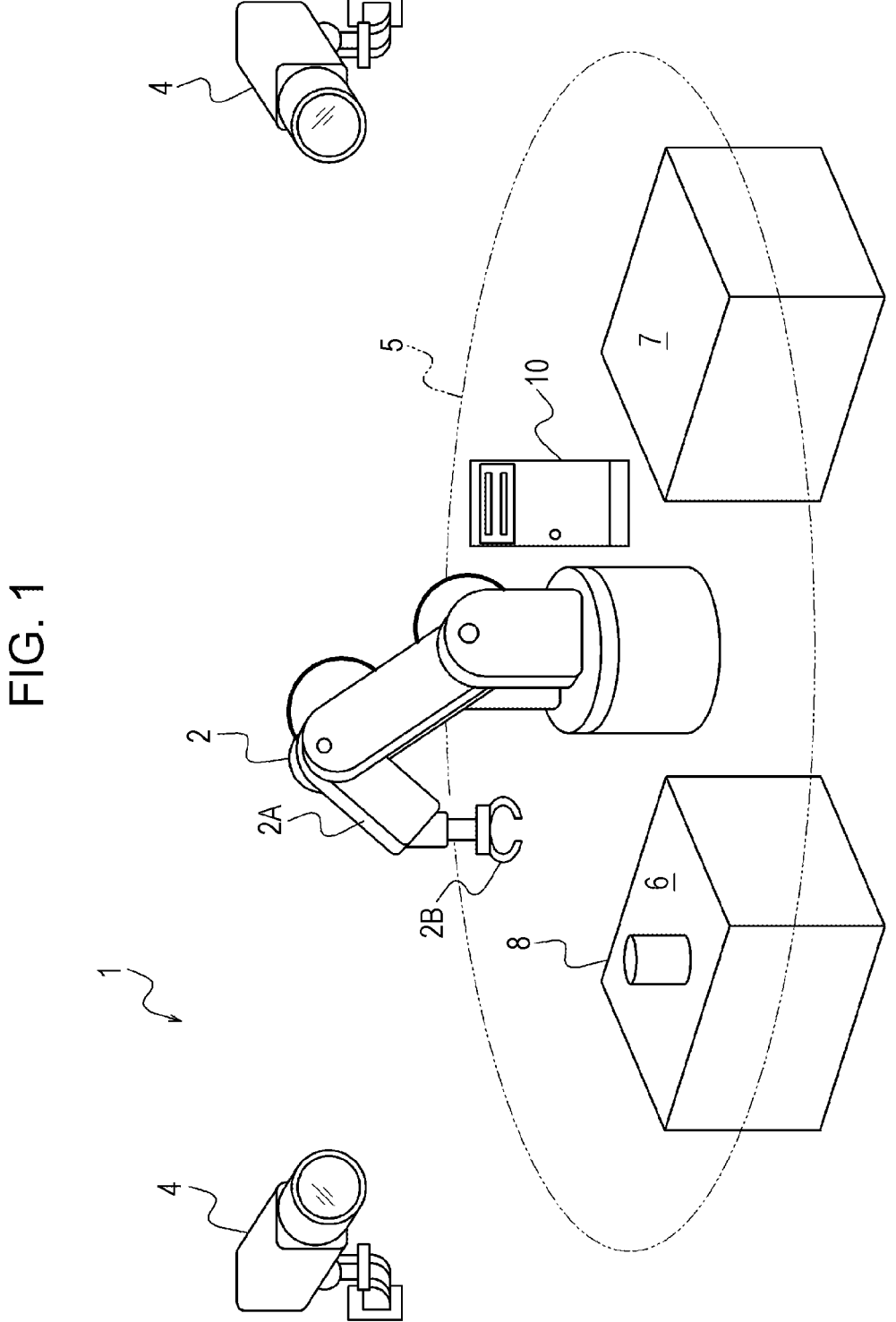
FIG. 1 is a schematic diagram illustrating an example of the configuration of a robot control system according to an embodiment.
Figure 2:
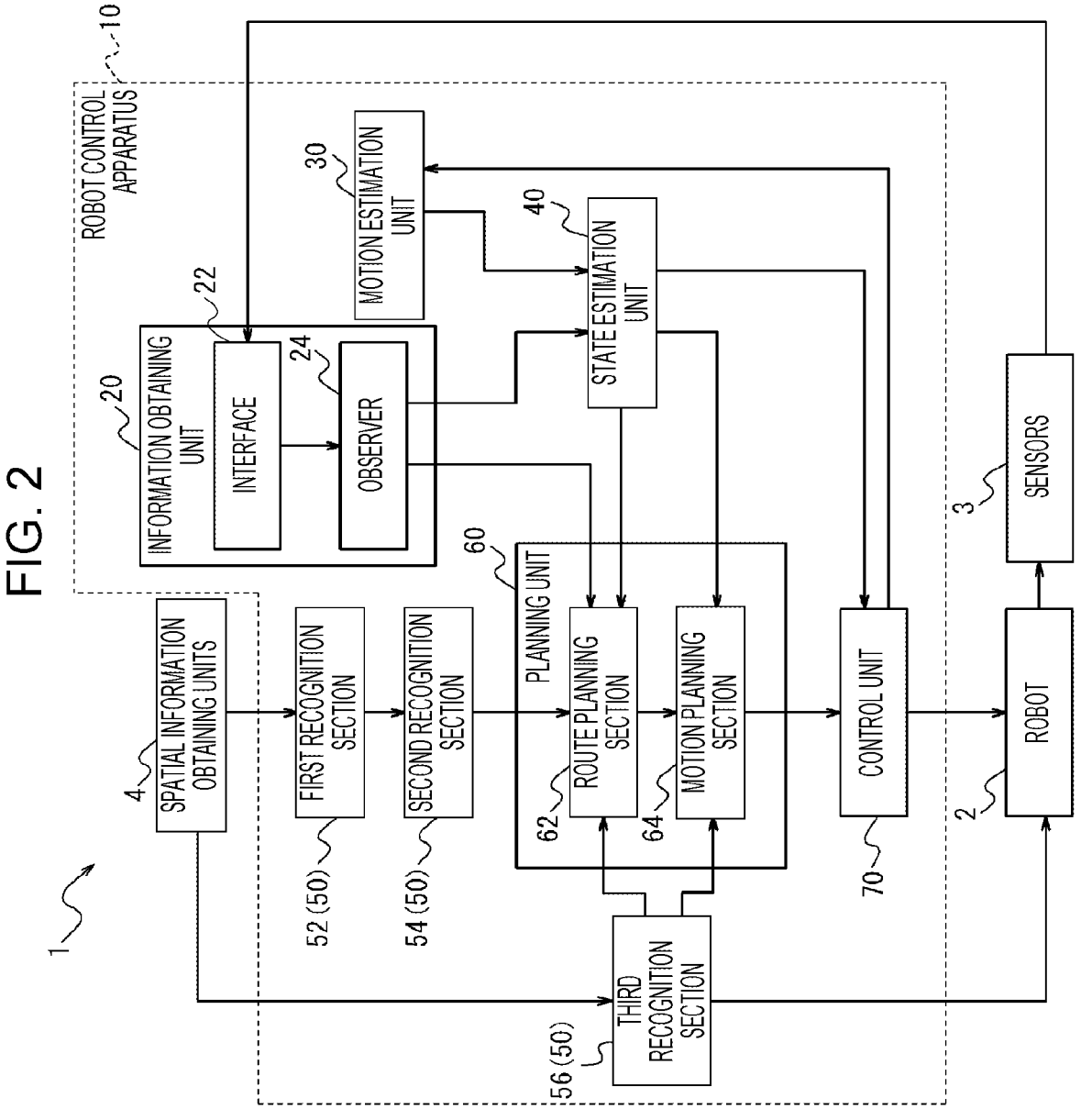
FIG. 2 is a block diagram illustrating an example of the configuration of the robot control system according to the embodiment.

In the embodiment of the present disclosure, a robot control system 1 includes a robot 2 and a robot control apparatus 10 as illustrated in FIGS. 1 and 2. The robot control apparatus 10 controls a motion of the robot 2. As illustrated in FIG. 1 as a schematic diagram, the robot 2 is assumed to move a workpiece 8 from a work start point 6 to a work target point 7 in the present embodiment. That is, the robot control apparatus 10 controls the robot 2 such that the workpiece 8 moves from the work start point 6 to the work target point 7. The workpiece 8 will also be referred to as an operation target. Components of the robot control system 1 will be described hereinafter with reference to FIGS. 1 and 2.

<Robot 2>

The robot 2 includes an arm 2A and an end effector 2B. The arm 2A may be, for example, a six-axis or seven-axis vertically articulated robot. The arm 2A may be a three-axis or four-axis horizontally articulated robot or a SCARA robot, instead. The arm 2A may be a two-axis or three-axis Cartesian coordinate robot, instead. The arm 2A may be a parallel link robot or the like, instead. The number of axes of the arm 2A is not limited to those mentioned above as examples.

The end effector 2B may include a gripping hand configured to be able to grip the workpiece 8. The gripping hand may include a plurality of fingers. The number of fingers of the gripping hand may be two or more. The fingers of the gripping hand may each include one or more joints. The end effector 2B may include a suction hand configured to be able to suck on the workpiece 8. The end effector 2B may include a scooping hand configured to be able to scoop the workpiece 8. The end effector 2B may include a tool such as a drill and be configured to able to perform various types of processing on the workpiece 8, such as drilling. The end effector 2B is not limited to these examples and may be configured to be able to perform various other operations, instead. In the configuration illustrated in FIG. 1, the end effector 2B is assumed to include a gripping hand.

The robot 2 can control a position of the end effector 2B by moving the arm 2A. The end effector 2B may include an axis that serves as a reference for a direction in which the end effector 2B performs an operation on the workpiece 8. When the end effector 2B includes an axis, the robot 2 can control a direction of the axis of the end effector 2B by moving the arm 2A. The robot 2 controls a start and an end of a motion of the end effector 2B for the workpiece 8. The robot 2 can move or process the workpiece 8 by controlling a motion of the end effector 2B while controlling the position of the end effector 2B or the direction of the axis of the end effector 2B. In the configuration illustrated in FIG. 1, the robot 2 causes the end effector 2B to grip the workpiece 8 at the work start point 6 and move the end effector 2B to the work target point 7. The robot 2 causes the end effector 2B to release the workpiece 8 at the work target point 7. The robot 2 can thus move the workpiece 8 from the work start point 6 to the work target point 7.

<Sensors 3>

As illustrated in FIG. 2, the robot control system 1 also includes sensors 3. The sensors 3 detect physical information regarding the robot 2. The physical information regarding the robot 2 may include information regarding an actual position or attitude of each of the components of the robot 2 or velocity or acceleration of each of the components of the robot 2. The physical information regarding the robot 2 may include information regarding force acting upon each of the components of the robot 2. The physical information regarding the robot 2 may include information regarding a current flowing to, or torque of, a motor that drives each of the components of the robot 2. The physical information regarding the robot 2 indicates a result of an actual motion of the robot 2. That is, the robot control system 1 can grasp a result of an actual motion of the robot 2 by obtaining the physical information regarding the robot 2.

The sensors 3 may include a force sensor or a tactile sensor that detects, as the physical information regarding the robot 2, force, distributed pressure, sliding, or the like acting upon the robot 2. The sensors 3 may include a motion sensor that detects, as the physical information regarding the robot 2, a position or an attitude of the robot 2 or velocity or acceleration of the robot 2. The sensors 3 may include a current sensor that detects, as the physical information regarding the robot 2, currents flowing to motors for driving the robot 2. The sensors 3 may include a torque sensor that detects, as the physical information regarding the robot 2, torque of the motors for driving the robot 2.

The sensors 3 may be provided at joints of the robot 2 or joint driving units for driving the joints. The sensors 3 may be provided at the arm 2A or the end effector 2B of the robot 2, instead.

The sensors 3 output the detected physical information regarding the robot 2 to the robot control apparatus 10. The sensors 3 output the physical information regarding the robot 2 at certain timings. The sensors 3 output the physical information regarding the robot 2 as time-series data.

<Spatial Information Obtaining Unit 4>

The robot control system 1 also includes spatial information obtaining units 4. The spatial information obtaining units 4 in the configuration example illustrated in FIG. 1 are configured to include two cameras. The cameras as the spatial information obtaining units 4 capture images of an object, a human, or the like inside an effect range 5, within which the motion of the robot 2 can be affected. The images captured by the cameras may include monochromatic luminance information or luminance information regarding colors indicated by RGB (red, green, and blue). The effect range 5 includes a motion range of the robot 2. The effect range 5 is obtained by extending the motion range of the robot 2 further outward. The effect range 5 may be set such that the robot 2 can be stopped before a human or the like who is moving from the outside of the motion range of the robot 2 to the inside of the motion range enters the motion range of the robot 2. The effect range 5 may be set as a range obtained, for example, by extending the motion range of the robot 2 outward by a certain distance from a boundary of the motion range.

The spatial information obtaining units 4 may be configured to include a visual sensor that detects spatial point cloud information. The spatial point cloud information is information indicating a space with feature points. The spatial information obtaining units 4 may detect the spatial point cloud information from images captured by the cameras.

The spatial information obtaining units 4 may be provided at a tip of the arm 2A of the robot 2 or a tip of the end effector 2B. The spatial information obtaining units 4 may be provided in such a way as to be able to capture images of the effect range 5 or the motion range of the robot 2 or an area around the effect range 5 or the motion range from above. The number of spatial information obtaining units 4 is not limited to two, and may be one, or three or more, instead.

The robot control apparatus 10 controls the robot 2 on the basis of images of at least part of the effect range 5 captured by the spatial information obtaining units 4. The motion range of the robot 2 includes the work start point 6 and the work target point 7 of the robot 2. The robot control apparatus 10 may identify the work start point 6 and the work target point 7 on the basis of images. The robot control apparatus 10 may identify the workpiece 8 located at the work start point 6 on the basis of images.

<Robot Control Apparatus 10>

The robot control apparatus 10 obtains the physical information regarding the robot 2 from the sensors 3 and images of the effect range 5 of the robot 2 from the spatial information obtaining units 4. The robot control apparatus 10 plans a motion of the robot 2 and generates information for controlling the robot 2 on the basis of the physical information regarding the robot 2 and the images of the effect range 5 of the robot 2. The information for controlling the robot 2 will also be referred to as control information. Furthermore, the robot control apparatus 10 estimates an ideal motion of the robot 2 based on the control information and feeds back a result of comparison between the estimated motion and an actual motion to the planning of the motion of the robot 2 and the generation of the control information.

The robot control apparatus 10 includes an information obtaining unit 20, a motion estimation unit 30, a state estimation unit 40, a recognition unit 50, a planning unit 60, and a control unit 70. The robot control apparatus 10 may be configured to include at least one processor in order to provide control and processing ability to execute various functions. Each of the components of the robot control apparatus 10 may be configured to include at least one processor. Some of the components of the robot control apparatus 10 may be achieved by one processor, instead. The entirety of the robot control apparatus 10 may be achieved by one processor, instead. The processor can execute a program for achieving the various functions of the robot control apparatus 10. The processor may be achieved as a single integrated circuit. The integrated circuit is also called an IC (integrated circuit). The processor may be achieved by as a plurality of integrated circuits and discrete circuits communicably connected to one another. The processor may be achieved on the basis of one of various other known techniques.

The robot control apparatus 10 may include a storage unit. The storage unit may include a magnetic storage medium such as a magnetic disk or a memory such as a semiconductor memory or a magnetic memory. The storage unit stores various pieces of information, programs to be executed by the robot control apparatus 10, and the like. The storage unit may function as a work memory of the robot control apparatus 10. At least part of the storage unit may be configured separately from the robot control apparatus 10.

The components of the robot control apparatus 10 will be described hereinafter.

<<Information Obtaining Unit 20>>

The information obtaining unit 20 may obtain the physical information regarding the robot 2 as results of detection performed by the sensors 3. The information obtaining unit 20 may obtain physical information that cannot be directly detected by the sensors 3 through estimation. The physical information that can be obtained by the information obtaining unit 20 indicates an actual position, attitude, and motion of the robot 2 and will also be referred to as actual physical information. The information obtaining unit 20 outputs the actual physical information to the planning unit 60. The information obtaining unit 20 also outputs the actual physical information to the state estimation unit 40, which will be described later.

The information obtaining unit 20 includes an interface 22 and an observer 24, although these components are not mandatory. The interface 22 obtains results of detection performed by the sensors 3 as the physical information regarding the robot 2. The observer 24 estimates on the basis of results of detection performed by the sensors 3, physical information that cannot be directly detected by the sensors 3. The physical information that cannot be directly detected by the sensors 3 includes, for example, information regarding a position of the tip of the arm 2A, information regarding a position of the tip of the end effector 2B, or the like.

<<Recognition Unit 50>>

The recognition unit 50 obtains images or spatial point cloud information from the spatial information obtaining units 4. The images or the spatial point cloud information obtained from the spatial information obtaining units 4 will also be referred to as spatial perception information. The recognition unit 50 recognizes the workpiece 8 inside the effect range 5 of the robot 2 on the basis of the spatial perception information and a motion to be made by the robot 2 for the workpiece 8. The recognition unit 50 outputs the recognized information to the planning unit 60. The information recognized by the recognition unit 50 will also be referred as recognition information.

The recognition unit 50 includes a first recognition section 52 and a second recognition section 54, although these components are not mandatory. The first recognition section 52 recognizes, on the basis of the spatial perception information, an object on which the robot 2 is to perform an operation. The first recognition section 52 will also be referred to as a pre-cognition engine. More specifically, the first recognition section 52 recognizes the workpiece 8 while distinguishing the workpiece 8 from other objects located around or behind the workpiece 8.

The second recognition section 54 recognizes information for recalling a motion to be made when the robot 2 performs an operation. The information for recalling a motion includes information leading to planning of an operation target of the robot 2. The information for recalling a motion may include, for example, information for identifying a part of the workpiece 8 to be gripped by the robot 2. The second recognition section 54 will also be referred to as a re-cognition engine.

<<Planning Unit 60>>

The planning unit 60 obtains the recognition information from the recognition unit 50 and the physical information regarding the robot 2 from the information obtaining unit 20. The planning unit 60 plans a route and a motion of the robot 2 on the basis of the recognition information and the physical information regarding the robot 2 and outputs information for identifying the planned route and motion to the control unit 70. The information for identifying a route and a motion planned by the planning unit 60 will also be referred to as plan information. The planning unit 60 also obtains, from the state estimation unit 40, which will be described later, information for feeding back a state of the robot 2. The planning unit 60 corrects the route and the motion of the robot 2 on the basis of the information for feeding back the state of the robot 2. The planning unit 60 may newly plan the route and the motion of the robot 2 on the basis of the information for feeding back the state of the robot 2.

The planning unit 60 includes a route planning section 62 and a motion planning section 64. The route planning section 62 plans a route followed by each component of the robot 2. The route planning section 62 will also be referred to as motion planning. More specifically, the route planning section 62 may represent a starting point, an ending point, and waypoints of a route followed by each component of the robot 2 with spatial coordinate information defined by an XYZ coordinate system. The route planning section 62 may represent an attitude of each component of the robot 2 at each of positions in a route with an angle of a corresponding joint of the robot 2. The motion planning section 64 plans velocity or angular velocity, or acceleration or angular acceleration, of the robot 2 at each position in the route of the robot 2. The motion planning section 64 will also be referred to as motion control.

<<Control Unit 70>>

The control unit 70 generates an amount of movement for the robot 2 and outputs the amount of movement to the robot 2 so that the robot 2 can be appropriately controlled on the basis of plan information obtained from the planning unit 60. The amount of movement for the robot 2 may include, for example, information for controlling an output of the motor for driving each component of the robot 2. The control unit 70 may include an arm control section that generates an amount of movement for the arm 2A of the robot 2 and an end effector control section that generates an amount of movement for the end effector 2B of the robot 2. The control unit 70 also obtains, from the state estimation unit 40, which will be described later, information for feeding back the state of the robot 2. The control unit 70 corrects the amount of movement for the robot 2 on the basis of the information for feeding back the state of the robot 2. The control unit 70 may newly generate an amount of movement for the robot 2 further on the basis of the information for feeding back the state of the robot 2.

<<Motion Estimation Unit 30>>

The motion estimation unit 30 includes a model plant obtained by modeling an ideal state of the robot 2. The motion estimation unit 30 inputs an amount of movement to the model plant and obtains an output of the model plant as physical information regarding the robot 2 obtained when the robot 2 is assumed to move ideally on the basis of the amount of movement. The physical information regarding the robot 2 obtained when the robot 2 is assumed to move ideally on the basis of the amount of movement will also be referred to as estimated physical information. That is, the motion estimation unit 30 can simulate a motion of the robot 2 and obtain the estimated physical information by inputting an amount of movement to the model plant. The motion estimation unit 30 obtains, as the estimated physical information, physical information corresponding to at least a subset of a plurality of items of physical information obtained by the information obtaining unit 20 from the sensors 3 directly through the interface 22 or using the observer 24. The motion estimation unit 30 outputs the obtained estimated physical information to the state estimation unit 40, which will be described later.

The model plant represents a relationship between an input of the robot 2 and an output of the robot 2. More specifically, an input of the robot 2 corresponds to an amount of movement generated and output by the control unit 70. The output of the robot 2 corresponds to physical information regarding the robot 2 obtained when the robot 2 has moved on the basis of an amount of movement.

The ideal state of the robot 2 corresponds to a case where the relationship between the input and the output satisfies linearity, a parameter for identifying the relationship between the input and the output is time-invariant, and the robot 2 moves in accordance with a law of causality where the output is determined by the input. Relationships that satisfy linearity include not only a relationship expressed by a proportional relationship but also a relationship that can be expressed by a linear differential equation. That is, relationships that satisfy linearity include a relationship where a superposition principle holds true. When the parameter is time-invariant, a value of the parameter does not change over time.

<<State Estimation Unit 40>>

The state estimation unit 40 estimates the state of the robot 2 on the basis of actual physical information obtained from the information obtaining unit 20 and estimated physical information obtained from the motion estimation unit 30. The state estimation unit 40 may estimate the state of the robot 2 on the basis of a difference between the actual physical information and the estimated physical information. The state estimation unit 40 may estimate the state of the robot 2 on the basis of a difference between a temporal change in the actual physical information and a temporal change in the estimated physical information. The state estimation unit 40 outputs a result of the estimation of the state of the robot 2 to at least the planning unit 60 or the control unit 70.

The state of the robot 2 can be classified into a state where the robot 2 is moving as simulated by a linear and time-invariant model plant or another state. The state of the robot 2 can be expressed as a difference between an actual motion and a motion simulated by a model plant.

The state of the robot 2 includes a state where the relationship between the input of the robot 2 and the output of the robot 2 is nonlinear. More specifically, the state of the robot 2 includes a state where a relationship between the amount of movement for the robot 2 and changes in the physical information at a time when the robot 2 moves in accordance with the input amount of movement is nonlinear. Conversely, when the robot 2 moves in the ideal state, the relationship between the amount of movement for the robot 2 and changes in the physical information at a time when the robot 2 moves in accordance with the input amount of movement is linear.

The state of the robot 2 includes a state where the value of the parameter indicating the relationship between the input of the robot 2 and the output of the robot 2 changes over time (time-variant state). More specifically, the state of the robot 2 includes a state where the value of the parameter indicating the relationship between the amount of movement for the robot 2 and changes in the physical information at a time when the robot 2 moves in accordance with the input amount of movement is time-variant. Conversely, when the robot 2 operates in the ideal state, the value of the parameter indicating the relationship between the amount of movement for the robot 2 and changes in the physical information at a time when the robot 2 moves in accordance with the input amount of movement does not change over time, that is, is time-invariant.

The state of the robot 2 includes a state where at least a subset of items of the physical information regarding the robot 2 is becoming close to singular points. More specifically, when the amount of change in values of at least a subset of items of the estimated physical information is larger than or equal to corresponding certain values, it can be estimated that the subset is becoming close to singular points. Conversely, when the amount of change in the value of each of the items of the estimated physical information is smaller than the corresponding certain value, it can be estimated that the item of the physical information regarding the robot 2 is not becoming close to a singular point.

The state estimation unit 40 may estimate the state of the robot 2 by determining whether the state of the robot 2 is each of the above-described states. The state estimation unit 40 may identify one of various other states other than the above-described states.

(Example of Operation of Robot Control Apparatus 10)

The robot control apparatus 10 may operate, for example, as follows. The recognition unit 50 generates recognition information on the basis of spatial perception information obtained from the spatial information obtaining units 4 and outputs the recognition information to the planning unit 60. The information obtaining unit 20 outputs, to the planning unit 60, actual physical information obtained from the sensors 3 through the interface 22 or estimated by the observer 24. The planning unit 60 plans a route and a motion of the robot 2 on the basis of the recognition information and the actual physical information and outputs the route and the motion to the control unit 70. The control unit 70 generates an amount of movement for controlling the robot 2 on the basis of a plan made by the planning unit 60 and outputs the amount of movement to the robot 2. The robot 2 moves the components thereof on the basis of the amount of movement obtained from the control unit 70.

The control unit 70 also outputs the amount of movement to the motion estimation unit 30. The motion estimation unit 30 calculates, as estimated physical information on the basis of a model plant obtained by modeling the ideal state of the robot 2 and the amount of movement obtained from the control unit 70, physical information regarding the robot 2 at a time when the robot 2 ideally moves and outputs the estimated physical information to the state estimation unit 40. The information obtaining unit 20 also outputs the actual physical information to the state estimation unit 40. The state estimation unit 40 estimates the state of the robot 2 on the basis of the actual physical information and the estimated physical information and feeds back a result of the estimation to at least the planning unit 60 or the control unit 70. The planning unit 60 corrects or newly generates a planned route and motion of the robot 2 on the basis of the result of the estimation of the state of the robot 2. The control unit 70 corrects or newly generates an amount of movement for the robot 2 on the basis of the result of the estimation of the state of the robot 2.

<Estimation of State of Robot 2>

The robot control system 1 controls the robot 2 while following a given scenario. The scenario includes information for identifying the workpiece 8 and information for identifying an operation to be performed on the workpiece 8. The scenario may include, for example, information for requesting placement of an object X on a tray a. In the present embodiment, the robot control system 1 controls the robot 2 while following the scenario including the information for identifying the workpiece 8 and information for identifying an operation where the workpiece 8 is moved from the work start point 6 to the work target point 7.

The robot control apparatus 10 plans a route and a motion of the robot 2 and generates an amount of movement such that the robot 2 is moved in accordance with a scenario while the motion of the robot 2 becomes close to a motion simulated by a linear and time-invariant model plant. In other words, the robot control apparatus 10 controls the robot 2 such that the actual physical information regarding the robot 2 becomes close to the estimated physical information.

As described above, the state estimation unit 40 can estimate the state of the robot 2 on the basis of the actual physical information and the estimated physical information. If a difference between a value of each of items of the actual physical information and a value of the item of the estimated physical information is smaller than a certain value, for example, the state estimation unit 40 may determine that the state of the robot 2 a state where the robot 2 is moving as simulated by the model plant. In other words, the state estimation unit 40 may determine that the state of the robot 2 is a state where the robot 2 is moving ideally. If the difference between the value of each of the items of the actual physical information and the value of the item of the estimated physical information is larger than or equal to the certain value, on the other hand, the state estimation unit 40 may determine that the state of the robot 2 is a state where the robot 2 is not moving as simulated by the model plant. In other words, the state estimation unit 40 may determine that the state of the robot 2 is a state where the robot 2 is not moving ideally.

As described above, the state of the robot 2 can be classified into several types. Specific examples where the state estimation unit 40 identifies the state of the robot 2 of each of the types will be described hereinafter.

<<Estimation of Nonlinear State>>

As described above, the state of the robot 2 includes a state where the relationship between the input of the robot 2 and the output of the robot 2 is nonlinear. An amount of movement for identifying a torque to be output to a driving motor is assumed to be input to the robot 2. If a relationship between the input amount of movement and the amount of movement for the arm 2A or the end effector 2B driven by the driving motor does not satisfy linearity, the state of the robot 2 is estimated to be a state where the relationship between the input of the robot 2 and the output of the robot 2 is nonlinear. The state estimation unit 40 may estimate whether the state of the robot 2 is nonlinear on the basis of a difference between the actual physical information and the estimated physical information. The state estimation unit 40 may determine whether the state of the robot 2 is nonlinear on the basis of a difference between a temporal change in the actual physical information and a temporal change in the estimated physical information.

The state where the relationship between the input and the output is nonlinear can be established, for example, when the workpiece 8 gripped by the robot 2 is unexpectedly heavy or light. In other words, the robot control apparatus 10 controls the robot 2 while taking into consideration inertial force acting upon the workpiece 8 so that the robot 2 ideally moves when the weight of the workpiece 8 is within a certain range. When the weight of the workpiece 8 is outside the certain range, therefore, the relationship between the input amount of movement and the actual amount of movement might not satisfy linearity due to a difference in the inertial force taken into consideration. As a result, the relationship between the input and the output can be nonlinear.

For example, the state estimation unit 40 can estimate as follows whether the relationship between the input and the output of the robot 2 satisfies linearity. The state estimation unit 40 obtains, from the information obtaining unit 20, actual physical information regarding each joint of the robot 2 as time-series data. The actual physical information regarding each joint may include, for example, torque of a driving motor, an angle or angular velocity of the joint, or velocity or acceleration of the joint in an actual motion of the robot 2.

The state estimation unit 40 obtains, from the motion estimation unit 30, estimated physical information regarding each joint of the robot 2 as time-series data. The estimated physical information regarding each joint may include, for example, torque of a driving motor, an angle or angular velocity of the joint, or velocity or acceleration of the joint at a time when the robot 2 ideally moves. At least a subset of items of the actual physical information and at least a subset of items of the estimated physical information are the same. The items of the actual physical information and the items of the estimated physical information may match, instead.

The state estimation unit 40 can estimate the weight of the workpiece 8 gripped by the robot 2 on the basis of the actual physical information and the estimated physical information. More specifically, the state estimation unit 40 can estimate the weight of the workpiece 8 on the basis of a difference between an equation of motion representing an actual motion of the robot 2 determined on the basis of a relationship between the amount of movement input to the robot 2 and the actual physical information and an equation of motion representing an ideal motion of the robot 2. Alternatively, the state estimation unit 40 can estimate the weight of the workpiece 8 on the basis of a difference between the amount of change in the actual physical information and the amount of change in the estimated physical information in a certain period of time.

The state estimation unit 40 may output an estimated value of the weight of the workpiece 8 to at least the planning unit 60 or the control unit 70 as information regarding the state of the robot 2. The planning unit 60 may update a route and a motion of the robot 2 by correcting or newly planning the route and the motion on the basis of the estimated value of the weight of the workpiece 8. The control unit 70 may correct or newly generate the amount of movement for the robot 2 on the basis of the estimated value of the weight of the workpiece 8.

If the estimated value of the weight of the workpiece 8 is outside the certain range, the state estimation unit 40 may output recalculation trigger information along with the estimated value of the weight. The recalculation trigger information refers to information for instructing the planning unit 60 to update the planned route and motion or the control unit 70 to update the amount of movement. Upon obtaining the recalculation trigger information, the planning unit 60 may update the route and the motion of the robot 2. Upon obtaining the recalculation trigger information, the control unit 70 may update the amount of movement for the robot 2.

If the estimated value of the weight of the workpiece 8 is outside the certain range, the state of the robot 2 is estimated to be a state where the relationship between the input and the output of the robot 2 is nonlinear. That is, the state estimation unit 40 may cause the planning unit 60 to update the planned route and motion or the control unit 70 to update the amount of movement while determining that the state of the robot 2 is a state where the relationship between the input and the output of the robot 2 is nonlinear.

The state estimation unit 40 may classify the estimated value of the weight of the workpiece 8 into one of classes. The state estimation unit 40 may output, to at least the planning unit 60 or the control unit 70, information regarding the class into which the estimated value of the weight is classified. The planning unit 60 may determine whether to update the planned route and motion of the robot 2 on the basis of the class into which the estimated value of the weight is classified. The control unit 70 may determine whether to update the amount of movement for the robot 2 on the basis of the class into which the estimated value of the weight is classified. The planning unit 60 or the control unit 70 may determine whether and how to update the plan or the amount of movement on the basis of information in which the classes and how to control the robot 2 are associated with each other.

For example, adjustment of the amount of movement, such as an increased torque through adjustment of gain, may be associated with a class corresponding to the estimated value of the weight slightly larger than an assumed certain range. A plan to decrease the speed or acceleration of the arm 2A, a plan of a route with which a load on the arm 2A decreases, or the like may be associated with a class corresponding to the estimated value of the weight greatly larger than the assumed certain range.

Correspondences between the estimated value of the weight of the workpiece 8 and how to control the robot 2 may be set in advance on the basis of rules. More specifically, appropriate ways of controlling the robot 2, how the planning unit 60 updates the plan, or how the control unit 70 updates the amount of movement associated with the estimated value of the weight or the classes for the estimated value may be set on the basis of rules.

When the estimated value of the weight of the workpiece 8 increases by greater than or equal to 0 g to smaller than 500 g from a weight assumed in the ideal state of the robot 2, for example, the estimated value may be classified into class (A). When the estimated value of the weight is classified into class (A), how to control the robot 2 may be appropriately updated by updating the amount of movement using the control unit 70. In this case, the control unit 70 may determine gain for updating the amount of movement.

When the estimated value of the weight of the workpiece 8 increases by greater than or equal to 500 g to smaller than 1500 g from the weight assumed in the ideal state of the robot 2, for example, the estimated value may be classified into class (B). When the estimated value of the weight of the workpiece 8 increases by greater than or equal to 1500 g from the weight assumed in the ideal state of the robot 2, the estimated value may be classified into class (C). When the estimated value of the weight is classified into class (B) or (C), how to the robot 2 may be appropriately updated by updating the planned route and motion using the planning unit 60 or updating the amount of movement using the control unit 70. A way of update associated with each of the classes is defined in advance.

The correspondences between the estimated value of the weight of the workpiece 8 and how to control the robot 2 may be set in advance through machine learning, instead.

By defining in advance a plan or how to update the amount of movement in accordance with the estimated value of the weight as described above, the planning unit 60 or the control unit 70 need not calculate in real-time a value to be achieved through update. As a result, an appropriate motion without delay can be achieved.

<<Estimation of Time-Variant State>>

As described above, the state of the robot 2 includes a state where the value of the parameter indicating the relationship between the input of the robot 2 and the output of the robot 2 changes over time (time-variant state). The state estimation unit 40 may estimate whether the state of the robot 2 is time-variant on the basis of a difference between the actual physical information and the estimated physical information. The state estimation unit 40 may estimate whether the state of the robot 2 is time-variant on the basis of a difference between a temporal change in the actual physical information and a temporal change in the estimated physical information. The state estimation unit 40 may estimate whether the state of the robot 2 is time-variant on the basis of a temporal change in the estimated physical information.

A state where the value of the parameter indicating the relationship between the input and the output is time-variant can be established, for example, when a gripping position of the workpiece 8 gripped by the robot 2 changes over time, that is, when the workpiece 8 slides.

The tactile sensor included in the end effector 2B that grips the workpiece 8 can detect the gripping position of the workpiece 8. That is, the state estimation unit 40 can obtain the gripping position of the workpiece 8 as actual physical information. When the robot 2 is moving ideally, the gripping position of the workpiece 8 does not change. In this case, the state estimation unit 40 can estimate, on the basis of a difference between the actual physical information and the estimated physical information, that the gripping position of the workpiece 8 has changed, that is, the workpiece 8 has slid. The state estimation unit 40 may also estimate a distance over which the workpiece 8 has slid.

The state estimation unit 40 can estimate sliding of the workpiece 8 or a distance over which the workpiece 8 has slid by monitoring time-series moment information regarding the actual physical information. The moment information corresponds to information indicating a change in physical information. The time-series moment information corresponds to moment information associated with time. If a temporal change in the moment information exceeds a certain threshold, the state estimation unit 40 may estimate that the workpiece 8 has slid. The temporal change refers to the amount of change in a certain period of time. The state estimation unit 40 may determine a temporal change in the moment information as an estimated value of a distance over which the workpiece 8 has slid.

The state estimation unit 40 may output a result of estimation of whether the workpiece 8 has slid or an estimated value of a distance over which the workpiece 8 has slid to at least the planning unit 60 or the control unit 70 as information regarding the state of the robot 2. The planning unit 60 may update the route and the motion of the robot 2 by correcting or newly planning the route and the motion on the basis of the result of the estimation of whether the workpiece 8 has slid or the estimated value of the distance over which the workpiece 8 has slid. The control unit 70 may correct or newly generate the amount of movement for the robot 2 on the basis of the result of the estimation of whether the workpiece 8 has slid or the estimated value of the distance over which the workpiece 8 has slid. If the workpiece 8 is estimated to have slid, the state estimation unit 40 may output recalculation trigger information.

If the workpiece 8 is estimated to have slid, the state of the robot 2 can be determined as a state where the value of the parameter indicating the relationship between the input and the output of the robot 2 is time-variant. That is, the state estimation unit 40 may determine that the state of the robot 2 is a state where the value of the parameter indicating that the relationship between the input and the output of the robot 2 is time-variant, and cause the planning unit 60 to update the planned route and motion or the control unit 70 to update the amount of movement.

The state estimation unit 40 may classify the estimated value of the distance over which the workpiece 8 has slid into one of classes. The state estimation unit 40 may output, to at least the planning unit 60 or the control unit 70, information regarding the class into which the estimated value of the distance over which the workpiece 8 has slid is classified. The planning unit 60 may determine whether to update the planned route and motion of the robot 2 on the basis of the class into which the estimated value of the distance over which the workpiece 8 has slid is classified. The control unit 70 may determine whether to update the amount of movement for the robot 2 on the basis of the class into which the estimated value of the distance over which the workpiece 8 has slid is classified. The planning unit 60 or the control unit 70 may determine whether and how to update the plan or the amount of movement on the basis of information in which the classes and how to control the robot 2 are associated with each other.

For example, adjustment of the amount of movement, such as an increased torque through adjustment of gain, may be associated with a class corresponding to the estimated value of the distance over which the workpiece 8 has slid smaller than a certain value. A plan to decrease the speed or acceleration of the arm 2A, a plan to release the workpiece 8 and then grip the workpiece 8 again, or the like may be associated with a class corresponding to the estimated value of the distance over which the workpiece 8 has slid larger than the certain value.

Correspondences between the estimated value of the distance over which the workpiece 8 has slid and how to control the robot 2 may be set in advance on the basis of rules. More specifically, appropriate ways of controlling the robot 2, how the planning unit 60 updates the plan, or how the control unit 70 updates the amount of movement associated with the estimated value of the distance over which the workpiece 8 has slid or the classes for the estimated value may be set on the basis of rules.

The correspondences between the estimated value of the distance over which the workpiece 8 has slid and how to control the robot 2 may be set in advance through machine learning, instead.

By defining in advance a plan or how to update the amount of movement in accordance with the estimated value of the distance over which the workpiece 8 has slid as described above, the planning unit 60 or the control unit 70 need not calculate in real-time a value to be achieved through update. As a result, an appropriate motion without delay can be achieved.

<<Estimation of State Becoming Close to Singular Points>>

As described above, the state of the robot 2 includes a state where at least a subset of the items of the physical information regarding the robot 2 is becoming close to singular points. The state estimation unit 40 may estimate, on the basis of a temporal change in the estimated physical information, whether the state of the robot 2 is becoming close to singular points.

The state estimation unit 40 monitors temporal changes in estimated physical information, which is obtained from the motion estimation unit 30, including the torque of the driving motors of the robot 2, the angles or the angular velocity of the joints of the arm 2A, the velocity or the acceleration of the joints, or the like. If the amount of change in values of at least a subset of the items of the estimated physical information in a certain period of time exceeds corresponding certain thresholds, the state estimation unit 40 may estimate that the items are becoming close to singular points. If absolute values of values of at least a subset of the items of the estimated physical information exceed corresponding certain thresholds, the state estimation unit 40 may estimate that the items are becoming close to singular points.

If estimating that at least a subset of the items of the estimated physical information is becoming close to singular points, the state estimation unit 40 may estimate values of the singular points. When the state estimation unit 40 estimates a singular point for a position of a joint, the state estimation unit 40 may estimate coordinates of the singular point. When the state estimation unit 40 estimates a singular point for an angle of a joint, the state estimation unit 40 may estimate an attitude of the singular point. After estimating a singular point, the state estimation unit 40 may provide a potential near coordinates or an attitude of the singular point and cause the planning unit 60 to plan a route and a motion for bypassing the potential. The planning unit 60 may obtain, from the state estimation unit 40, a result of the estimation of the singular point as the state of the robot 2 and update the route and the motion of the robot 2 such that the potential is bypassed. After estimating a singular point, the state estimation unit 40 may output recalculation trigger information.

As described above, by estimating a singular point as the state of the robot 2, a motion for bypassing the singular point is achieved. A singular point can be bypassed, too, on the basis of a route and a motion of the robot 2 planned by the planning unit 60.

SUMMARY

As described above, the robot control apparatus 10 can estimate the state of the robot 2 and feed back the state of the robot 2. In doing so, even when the state of the robot 2 is not the ideal state, the route and the motion of the robot 2 or the amount of movement for the robot 2 is updated in accordance with the state of the robot 2. As a result, the robot 2 can be appropriately controlled regardless of the state of the robot 2.

(Method for Controlling Robot)

Figure 3:
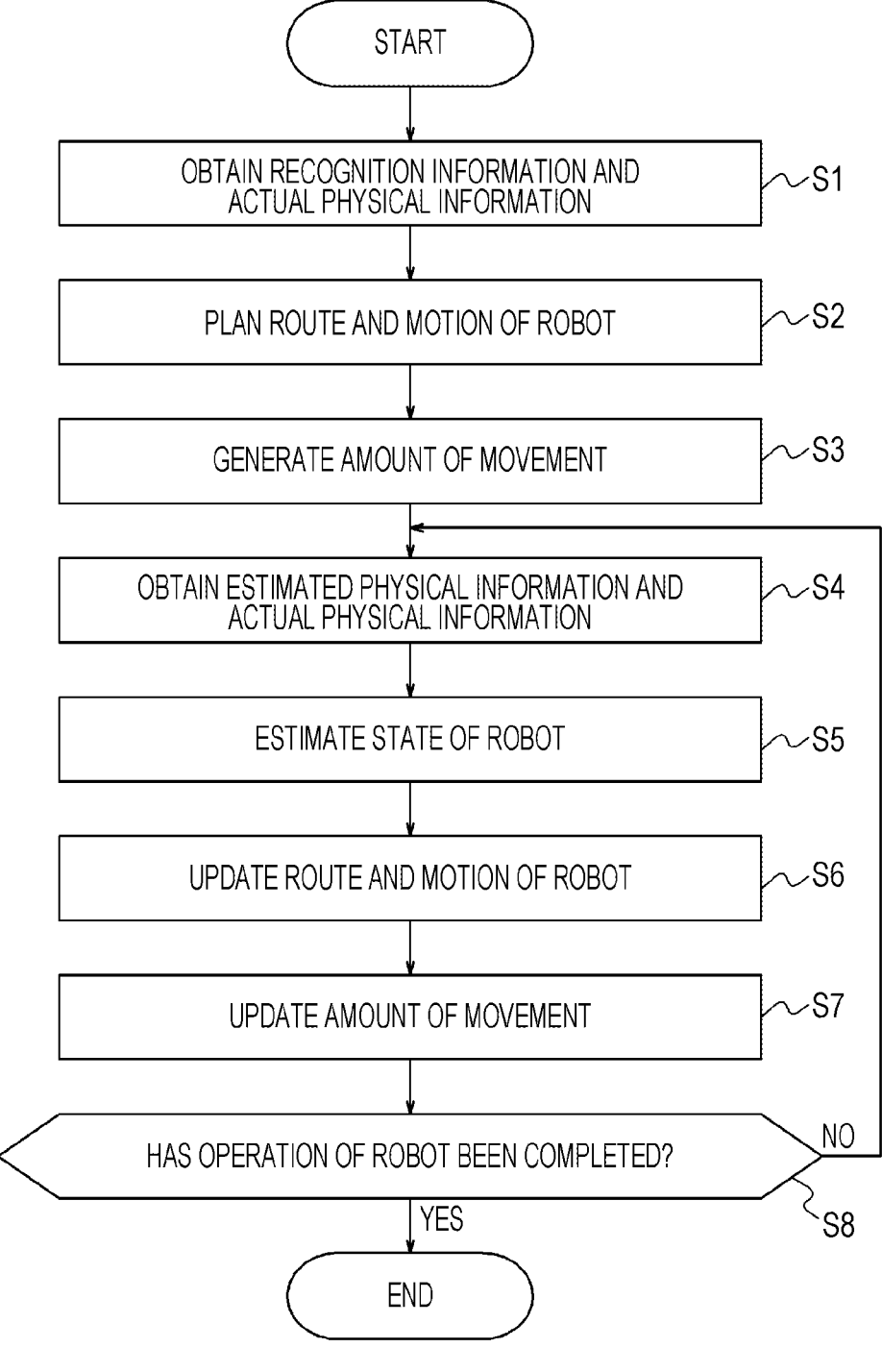
FIG. 3 is a flowchart illustrating an example of a procedure of a method for controlling a robot according to the embodiment.

The robot control apparatus 10 may perform a method for controlling a robot including a procedure illustrated in a flowchart of FIG. 3. The method for controlling a robot may be achieved as a program for controlling a robot to be executed by a processor included in the robot control apparatus 10. The program for controlling a robot may be stored in a non-transitory computer-readable medium.

The planning unit 60 of the robot control apparatus 10 obtains recognition information from the recognition unit 50 and actual physical information from the information obtaining unit 20 (step S1).

The planning unit 60 plans a route and a motion of the robot 2 on the basis of the recognition information and the actual physical information (step S2). The planning unit 60 outputs the planned route and motion of the robot 2 to the control unit 70.

The control unit 70 of the robot control apparatus 10 generates, on the basis of the plan obtained from the planning unit 60, an amount of movement for controlling the robot 2 (step S3). The control unit 70 outputs the generated amount of movement to the robot 2. The robot 2 moves by driving the arm 2A or the end effector 2B on the basis of the amount of movement. The sensors 3 detect physical information regarding the robot 2 after the robot 2 moves on the basis of the amount of movement and outputs the physical information to the information obtaining unit 20. The information obtaining unit 20 outputs the obtained physical information or physical information estimated on the basis of the obtained physical information to the state estimation unit 40 as actual physical information. The control unit 70 also outputs the generated amount of movement to the motion estimation unit 30. The motion estimation unit 30 outputs, to the state estimation unit 40 as estimated physical information, physical information at a time when the robot 2 is assumed to move ideally on the basis of the amount of movement.

The state estimation unit 40 of the robot control apparatus 10 obtains the actual physical information from the information obtaining unit 20 and the estimated physical information from the motion estimation unit 30 (step S4).

The state estimation unit 40 estimates the state of the robot 2 on the basis of the actual physical information and the estimated physical information (step S5). The state estimation unit 40 outputs a result of the estimation of the state of the robot 2 to at least the planning unit 60 or the control unit 70.

The planning unit 60 updates the route and the motion of the robot 2 on the basis of the result of the estimation of the state of the robot 2 (step S6). The planning unit 60 may correct the planned route and motion of the robot 2. The planning unit 60 may newly plan a route and a motion of the robot 2, instead.

The control unit 70 updates the amount of movement for the robot 2 on the basis of the result of the estimation of the state of the robot 2 (step S7). The control unit 70 may correct the generated amount of movement for the robot 2. The control unit 70 may newly generate an amount of movement for the robot 2.

The robot control apparatus 10 determines whether the robot 2 has completed an operation (step S8). The robot control apparatus 10 may determine, on the basis of information regarding an operation target included in the recognition information, for example, whether an operation performed on the workpiece 8 has been completed. If determining that the robot 2 has completed an operation (step S8: YES), the robot control apparatus 10 ends the execution of the procedure illustrated in the flowchart of FIG. 3. If the robot 2 has not completed an operation (step S8: NO), the robot control apparatus 10 returns to step S4.

With the method for controlling a robot described above, a result of estimation of the state of the robot 2 is fed back for the control of the robot 2. In doing so, a route and a motion of the robot 2 or an amount of movement for the robot 2 is updated in accordance with the state of the robot 2 even when the state of the robot 2 is not the ideal state. As a result, the robot 2 can be appropriately controlled regardless of the state of the robot 2.

Other Embodiments

<Reduction of Effect Upon Humans>

The recognition unit 50 further includes a third recognition section 56, although this component is not mandatory. The third recognition section 56 recognizes presence or behavior of a human inside the effect range 5. The third recognition section 56 may recognize presence or behavior of a human inside the effect range 5 on the basis of a trained model obtained by learning features of a human body. The features of the human body may include, for example, facial features such as eyes, a nose, or a mouth. The features of the human body may include features of a torso such as a chest, an abdomen, a back, hips, or buttocks. The features of the human body may include features of limbs including arms or legs or features of a head. The third recognition section 56 may recognize presence or behavior of a human inside the effect range 5 on the basis of a trained model obtained by learning a relationship between spatial perception information and the features of the human body.

The third recognition section 56 may generate, on the basis of a result of recognition of presence or behavior of a human inside the effect range 5, information regarding a motion of the robot 2 such that the robot 2 does not collide with the human or damage to the human is minimized in the case of a collision with the robot 2. The third recognition section 56 may directly output the information regarding the motion of the robot 2 to the robot 2 as control information regarding the robot 2. The third recognition section 56 may cause the planning unit 60 to generate the control information regarding the robot 2 by outputting the information regarding the motion of the robot 2 to the planning unit 60, instead.

The third recognition section 56 may calculate a distance between the human and the robot 2 on the basis of the spatial perception information. The third recognition section 56 may generate, on the basis of a result of the calculation of the distance between the human and the robot 2, the information regarding the motion of the robot 2 such that the robot 2 does not collide with the human or damage to the human is minimized in the case of a collision with the robot 2.

The third recognition section 56 may set classes for a distance between a human and the robot 2. The third recognition section 56 may associate an appropriate motion of the robot 2 for a distance classified into each of the classes with the class. The third recognition section 56 may set a first class, in which the distance between a human and the robot 2 is shorter than an emergency stop distance, for example, and associate an emergency stop of the robot 2 with the first class. The third recognition section 56 may set a second class, in which the distance between a human and the robot 2 is longer than or equal to the emergency stop distance and shorter than a certain value, and associate, with the second class, a motion for minimizing kinetic energy at a time of a collision between the robot 2 and the human. The third recognition section 56 may set a third class, in which the distance between a human and the robot 2 is longer than or equal to the certain value, and associate, with the third class, a motion for the robot 2 to avoid a collision with the human or a motion for reducing damage from a collision with the human.

The third recognition section 56 may include a motion determiner that associates an appropriate motion of the robot 2 for a distance between a human and the robot 2 classified into each of the classes for the distance with the class. The motion determiner promptly stops the robot 2, generates a trajectory in a direction in which kinetic energy at a time of a collision decreases, or generates a trajectory for avoiding a collision. The motion determiner may transmit a signal for generating a route or a trajectory of the robot 2 to the planning unit 60 so that the robot 2 appropriately moves. The planning unit 60 may generate a route or a trajectory of the robot 2 on the basis of the signal transmitted from the motion determiner. The motion determiner may directly transmit, to the robot 2, an emergency stop signal for immediately stopping the robot 2. The robot 2 may include an emergency stop apparatus. The emergency stop apparatus may immediately stop the robot 2 on the basis of the emergency stop signal transmitted from the motion determiner. The control unit 70 may include the emergency stop apparatus. If estimating on the basis of the estimated physical information that the robot 2 will collide with a human, the control unit 70 may stop the robot 2.

The planning unit 60 may generate the control information regarding the robot 2 while giving priority to the information obtained from the third recognition section 56 over the information obtained from the information obtaining unit 20, the state estimation unit 40, the first recognition section 52, or the second recognition section 54. That is, the control unit 70 may generate the control information while giving priority to, in information regarding a space where the motion of the robot 2 is affected, information regarding a human inside the space where the motion of the robot 2 is affected over other pieces of information.

<Example of Control when Supplied Voltage Varies>

When a voltage supplied to the robot 2 is instable, the robot 2 might not be able to move in accordance with an amount of movement or might come to an emergency stop. With the robot control system 1 in the present disclosure, variation in the supplied voltage can be estimated on the basis of a difference between the estimated physical information from the motion estimation unit 30 and the actual physical information from the information obtaining unit 20 or a difference in temporal changes between the estimated physical information and the actual physical information. By estimating variation in the supplied voltage, an emergency stop of the robot 2 can be avoided or an appropriate motion of the robot 2 can be achieved.

The state estimation unit 40 can estimate variation in the supplied voltage as the state of the robot 2 on the basis of a supplied voltage estimation learning system including a trained model, which is obtained by learning a relationship between information regarding a difference between the estimated physical information and the actual physical information and the voltage supplied to the robot 2.

If the supplied voltage is lower than a certain value, for example, the difference between the actual physical information and the estimated physical information can increase. In this case, the robot control apparatus 10 increases the amount of movement by increasing gain of the control unit 70 so that the actual physical information follows the estimated physical information. If a cause of the actual physical information not being able to follow the estimated physical information is a decrease in the supplied voltage, however, the actual physical information cannot follow the estimated physical information even when the amount of movement is increased. The state estimation unit 40 can estimate variation in the supplied voltage on the basis of the fact that the actual physical information cannot follow the estimated physical information even when the amount of movement is increased. The state estimation unit 40 may estimate the amount of decrease in the supplied voltage.

The state estimation unit 40 outputs a result of the estimation of variation in the supplied voltage or an estimated value of the amount of decrease in the supplied voltage to the planning unit 60 or the control unit 70 as a result of the estimation of the state of the robot 2. The planning unit 60 or the control unit 70 may update the planned route and motion of the robot 2 or the amount of movement for the robot 2 in accordance with the decrease in the supplied voltage.

<External Notification of Result of Estimation of State of Robot 2>

The state estimation unit 40 may output a result of estimation of the state of the robot 2 to an external apparatus. The external apparatus may include a display device, such as a display, capable of notifying the user of information or a sound output device such as a speaker. The user to be notified of a result of estimation of the state of the robot 2 may include, for example, a company that performs system integration (Sler), an on-site worker, a user of a cloud service (cloud user), or the like. When an on-site worker is notified of an estimated value of the supplied voltage, for example, the on-site worker can recognize occurrence of variation in the supplied voltage and respond to the variation.

The state estimation unit 40 may notify the user of a result of estimation of the state of the robot 2 at a timing desired by the user. The state estimation unit 40 may notify of the result of estimation of the state of the robot 2 at certain time intervals or constantly. The state estimation unit 40 may notify of the result of estimation of the state of the robot 2 if the result of estimation corresponds to an error. The state estimation unit 40 may notify of the result of estimation of the state of the robot 2 if the state of the robot 2 is a state where emergency measures need to be taken for the robot 2, instead. The state estimation unit 40 may notify of the result of estimation of the state of the robot 2 after security of the robot 2 is checked, instead.

<Example of Method for Estimating State of Robot 2>

The state estimation unit 40 may include a machine learning system including a trained model obtained by learning a relationship between information regarding a difference between the actual physical information and the estimated physical information and the state of the robot 2. The state estimation unit 40 may estimate the state of the robot 2 by inputting the actual physical information and the estimated physical information to the machine learning system and output a result of the estimation to the planning unit 60 or the control unit 70. When the machine learning system is used, the state of the robot 2 can be accurately estimated from characteristic tendencies, even if the actual physical information includes noise.

The state estimation unit 40 may include a system for which a relationship between information regarding a difference between the actual physical information and the estimated physical information and the state of the robot 2 is set on the basis of rules. The state estimation unit 40 may estimate the state of the robot 2 by inputting the actual physical information and the estimated physical information to the system set on the basis of rules and output a result of the estimation to the planning unit 60 or the control unit 70. When the system set on the basis of rules is used, the state estimation unit 40 can move on the basis of the specified rules. As a result, the state estimation unit 40 does not make an unpredicted move. When the system is changed or reconstructed, necessary operation steps or operation time or cost can be reduced.

When the state estimation unit 40 includes the machine learning system and the system set on the basis of rules, the state estimation unit 40 can select a system in accordance with information to be estimated. In this case, the state estimation unit 40 can estimate various states. In addition, the amount of data processed in real-time can be reduced. As a result, a delay in motion can be reduced.

The drawings for explaining the embodiment of the present disclosure are schematic ones. Dimensional ratios and the like on the drawings do not necessarily match ones in reality.

Although the embodiment of the present disclosure has been described on the basis of the drawings and the examples, it is to be noted that those skilled in the art can easily change or alter the embodiment in various ways on the basis of the present disclosure. It is to be noted that the scope of the present disclosure also includes such changes or alterations. For example, the functions and the like of the components may be rearranged insofar as no logical contradiction is caused, and a plurality of components may be combined together or further divided.

Terms such as "first" and "second" in the present disclosure are identifiers for distinguishing the components. The components distinguished with the terms such as "first" and "second" in the present disclosure may exchange the numbers thereof. For example, the first recognition section may exchange "first" for "second", which are identifiers, with the second recognition section. The identifiers are simultaneously exchanged. Even after the exchange of the identifiers, the components are distinguished from each other. Identifiers may be removed. Components from which identifiers are removed are distinguished from each other by reference numerals. The identifiers such as "first" and "second" in the present disclosure are not intended to be used as a sole basis for interpretation of order of the components or presence of an identifier with a smaller number.

The invention claimed is:

1. A robot control apparatus comprising:

a control unit configured to generate, as control information, information regarding an amount of movement for controlling a motion of a robot on a basis of information regarding an operation target of the robot included in information regarding a space where the motion of the robot is affected and that outputs the control information to the robot;

an information obtaining unit configured to obtain, as actual physical information, physical information indicating a result of an actual motion of the robot based on the control information;

a motion estimation unit configured to output information output from a model plant, which is obtained by modeling an ideal state of the robot, by inputting the control information to the model plant as estimated physical information, which is obtained when the robot is assumed to move ideally on a basis of the control information; and a state estimation unit configured to estimate a state of the robot on a basis of the actual physical information and the estimated physical information, wherein the control unit is further configured to generate the control information on a basis of a result of the estimation of the state of the robot.

2. A robot control apparatus comprising:

a planning unit configured to plan a route and a motion of a robot on a basis of information regarding an operation target of the robot included in information regarding a space where the motion of the robot is affected;

an information obtaining unit configured to obtain, as actual physical information, physical information indicating a result of an actual motion of the robot based on the planned route and motion of the robot;

a motion estimation unit configured to output information output from a model plant, which is obtained by modeling an ideal state of the robot, by inputting control information regarding an amount of movement for controlling the motion of the robot, the amount of movement being determined in accordance with the planned route and motion of the robot, to the model plant as estimated physical information, which is obtained when the robot is assumed to move ideally on a basis of the control information; and a state estimation unit configured to estimate a state of the robot on a basis of the actual physical information and the estimated physical information, wherein the planning unit is further configured to plan the route and the motion of the robot further on a basis of a result of the estimation of the state of the robot.

3. The robot control apparatus according to claim 2, wherein the planning unit plans the route and the motion of the robot further on a basis of information regarding a human inside the space where the motion of the robot is affected.

4. The robot control apparatus according to claim 3, wherein the planning unit plans the route and the motion of the robot while giving priority to, in the information regarding the space where the motion of the robot is affected, the information regarding the human inside the space where the motion of the robot is affected over other pieces of information.

5. The robot control apparatus according to claim 3, wherein, if estimating on a basis of the estimated physical information that the robot will collide with the human, the planning unit plans the motion of the robot such that the robot stops.

6. The robot control apparatus according to claim 1, wherein the state estimation unit estimates, on a basis of a difference between the actual physical information and the estimated physical information, whether the state of the robot is nonlinear.

7. The robot control apparatus according to claim 6, wherein the state estimation unit estimates, on a basis of a difference between a temporal change in the actual physical information and a temporal change in the estimated physical information, whether the state of the robot is nonlinear.

8. The robot control apparatus according to claim 1, wherein the state estimation unit estimates, on a basis of a difference between the actual physical information and the estimated physical information, whether the state of the robot is time-variant.

9. The robot control apparatus according to claim 8, wherein the state estimation unit estimates, on a basis of a difference between a temporal change in the actual physical information and a temporal change in the estimated physical information, whether the state of the robot is time-variant.

10. The robot control apparatus according to claim 1, wherein the state estimation unit estimates, on a basis of a temporal change in the actual physical information, whether the state of the robot is time-variant.

11. The robot control apparatus according to claim 1, wherein the state estimation unit estimates, on a basis of a temporal change in the estimated physical information, whether the state of the robot is becoming close to a singular point.

12. The robot control apparatus according to claim 1, wherein the state estimation unit estimates the state of the robot on a basis of a machine learning system including a trained model, which is obtained by learning in advance a relationship between a difference between the actual physical information and the estimated physical information and the state of the robot.

13. The robot control apparatus according to claim 1, wherein the state estimation unit estimates the state of the robot on a basis of a system for which the relationship between the difference between the actual physical information and the estimated physical information and the state of the robot is set in advance on a basis of a rule.

14. The robot control apparatus according to claim 1, wherein the robot includes an arm and an end effector, wherein the control unit includes an arm control section that generates information regarding an amount of movement for controlling the arm and an end effector control section that generates information regarding an amount of movement for controlling the end effector.

15. A robot control system comprising:

the robot control apparatus according to claim 1;

a spatial information obtaining unit that obtains information regarding a space where a motion of the robot is affected; and a sensor that detects physical information regarding the robot.

16. A method for controlling a robot, the method comprising:

planning a route and a motion of a robot on a basis of information regarding an operation target of the robot included in information regarding a space where the motion of the robot is affected;

obtaining, as actual physical information, physical information indicating a result of an actual motion of the robot based on the planned route and motion of the robot;

outputting information output from a model plant, which is obtained by modeling an ideal state of the robot, by inputting control information regarding an amount of movement for controlling the motion of the robot, the amount of movement being determined in accordance with the planned route and motion of the robot, to the model plant as estimated physical information, which is obtained when the robot is assumed to move ideally on a basis of the control information; and estimating a state of the robot on a basis of the actual physical information and the estimated physical information, wherein the route and the motion of the robot is planned further on a basis of a result of the estimation of the state of the robot.

* * * * *